United States Patent
Fukasawa et al.

(10) Patent No.: US 7,024,304 B2
(45) Date of Patent: Apr. 4, 2006

(54) DIAGNOSIS SYSTEM FOR VARIABLE VALVE CONTROLLER

(75) Inventors: Osamu Fukasawa, Nagoya (JP); Hideki Obayashi, Okazaki (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 11/038,413

(22) Filed: Jan. 21, 2005

(65) Prior Publication Data

US 2005/0165536 A1    Jul. 28, 2005

(30) Foreign Application Priority Data

Jan. 23, 2004    (JP) .............................. 2004-015411

(51) Int. Cl.
*G06F 19/00* (2006.01)
(52) U.S. Cl. ...................................... 701/111
(58) Field of Classification Search ................ 701/111, 701/110, 114; 123/90.15, 90.17
See application file for complete search history.

(56) References Cited

U.S. PATENT DOCUMENTS

2004/0173172 A1    9/2004  Harada et al.

FOREIGN PATENT DOCUMENTS

| JP | B2-2817055 | 8/1988 |
| JP | A-2-308911 | 12/1990 |
| JP | A-3-172516 | 7/1991 |
| JP | A-4-159426 | 6/1992 |
| JP | 5-52105 A * | 3/1993 |
| JP | B2-2571629 | 10/1996 |

* cited by examiner

*Primary Examiner*—Hieu T. Vo
(74) *Attorney, Agent, or Firm*—Nixon & Vanderhye P.C.

(57) ABSTRACT

A control mode of an intake valve lift controller is changed between a low-speed mode and a high-speed mode. Based on the control mode, an ignition timing is adjusted. When a knocking is detected by a knock sensor after the control mode is changed from the low-speed mode to the high-speed mode, it is determined that the intake valve lift controller has a malfunction in which the intake valve lift controller is stuck in the low-speed mode. When a combustion stability is lowered to a predetermined level after the control mode is changed from the high-speed mode to the low-speed mode, it is determined that the intake valve lift controller has a malfunction in which the intake valve lift controller is stuck in the high-speed mode.

4 Claims, 7 Drawing Sheets

DIAGNOSIS SYSTEM FOR VARIABLE VALVE CONTROLLER

CROSS REFERENCE TO RELATED APPLICATION

This application is based on Japanese Patent Application No. 2004-015411 filed on Jan. 23, 2004, the disclosure of which is incorporated herein by reference.

FIELD OF THE INVENTION

The present invention relates to a diagnosis system for a variable valve controller. The variable valve controller varies a valve profile of an intake valve and/or an exhaust valve. The valve profile represents a valve lift amount, a valve-opening period, a valve timing, and the like.

BACKGROUND OF THE INVENTION

It is known an engine for an automobile, which is provided with a variable valve controller varying a valve profile of an intake valve and/or an exhaust valve in order to improve the power, enhance the fuel economy, and reduce the exhaust emission of the engine. For instance, the variable valve controller changes the control mode of the valves between a low-speed mode and a high-speed mode. In the low-speed mode, a cam which drives the valve is turned into a low-speed cam to reduce the valve lift amount for obtaining a stable combustion. In high-speed mode, the cam is turned into a high-speed cam to increase the valve lift amount for enhancing the power of the engine.

In such a variable valve controller, when the valve mode is not changed properly, the drivability of engine is deteriorated. For instance, when an actual control mode is still in the high-speed mode even though the control mode should be turned into the low-speed mode in a low-load driving condition, the combustion stability is deteriorated to cause the engine stalling. When the actual control mode is still in the low-speed mode even though the control mode should be turned into the high-speed mode in a high-load driving condition, the power of engine is reduced to deteriorate an acceleration thereof.

Under such a situation, diagnosis systems for the variable valve controller have been proposed. Japanese Patent No. 2817055 shows a diagnosis system in which malfunctions of the variable valve controller are detected based on a deviation between an actual valve lift amount sensed by a lift sensor and a reference valve lift amount determined on the basis of the engine speed.

Japanese Patent No. 2571629 shows a diagnosis system in which the valve-close timing is detected by a vibration sensor to be compared with a reference timing, by which malfunctions of the variable valve controller are detected.

JP-4-159426 A shows a diagnosis system in which an intake pipe pressure derived from control conditions of the engine and variable valve controller is compared with an actual intake pipe pressure detected by an intake pipe pressure sensor, by which malfunctions of the variable valve controller are detected.

In the diagnosis system shown in Japanese Patent No. 2817055, it is necessary to newly provide a lift sensor and to keep a mounting space for the lift sensor in a narrow space at vicinity of the valve, which makes the system complicated and increases a cost.

In the diagnosis systems shown in Japanese Patent No. 2571629 and JP-4-159426 A, since the output signals from the pressure sensor and the lift sensor include noises, it is relatively hard to distinguish correct signals from incorrect signals. Therefore, it is difficult to diagnose the variable valve controller correctly.

SUMMARY OF THE INVENTION

The present invention is made in view of the foregoing matter and it is an object of the present invention to provide a diagnosis system for a variable valve controller which correctly diagnoses the variable valve controller, to simplify the structure thereof, and to reduce the cost thereof.

According to the present invention, the diagnosis system includes the variable valve controller which changed a valve profile of an intake valve and/or an exhaust valve from a control mode to another control mode based on a condition of an internal combustion engine. An ignition timing is varied according to a change of the control mode. The diagnosis system includes a knock detecting means for detecting a knocking of the internal combustion engine, and a malfunction diagnosis means for diagnosing whether a malfunction of the variable valve controller exists based on a detecting result by the knock detecting means when the control mode of the variable valve controller is changed.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EMBODIMENT

An embodiment of the present invention will be described hereinafter with reference to the drawings.

Figure 1:
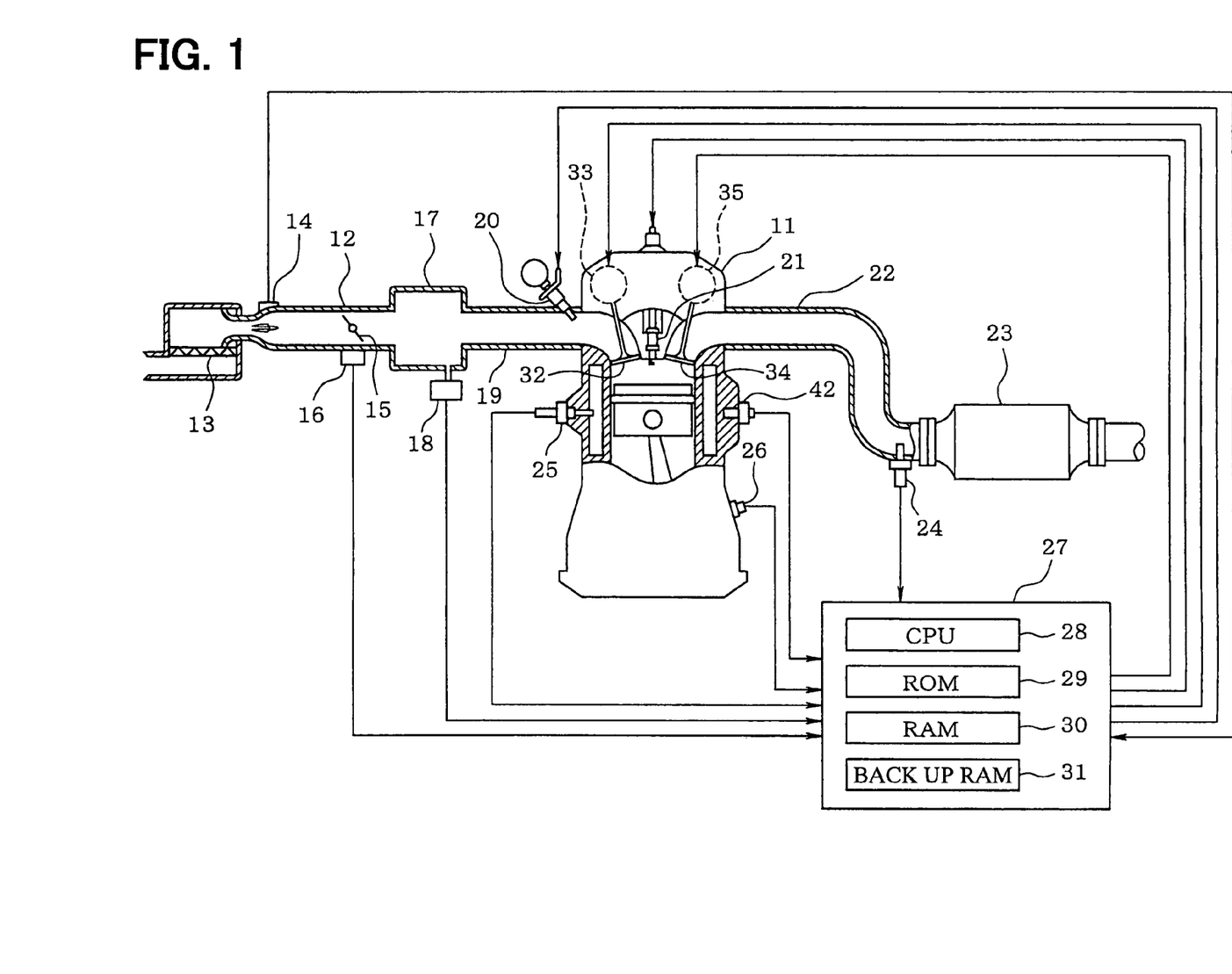
FIG. 1 is a schematic view of an engine control system according to an embodiment of the present invention.

The schematic construction of the entirety of an engine control system is illustrated in FIG. 1. An engine 11 is provided with an air cleaner 13 at the most upstream portion of an intake pipe 12 and with an air flow meter 14 for detecting an intake airflow on the downstream side of the air cleaner 13. On the downstream side of the air flow meter 14, there are disposed a throttle valve 15 having an opening adjusted by a DC motor or the like, and a throttle opening sensor 16 for detecting the throttle opening.

On the downstream side of the throttle valve 15, moreover, there is disposed a surge tank 17, which is provided with an intake pipe pressure sensor 18 for detecting the intake pipe pressure. Moreover, the surge tank 17 is provided with an intake manifold 19 for introducing the intake air into the individual cylinders of the engine 11. Fuel injection valves 20 for individually injecting the fuel are attached to the vicinities of the intake ports of the intake manifold 19 of the individual cylinders. To the cylinder head of the engine 11, moreover, there are attached ignition plugs 21 for the individual cylinders, so that the air/fuel mixtures in the cylinders are ignited by the spark discharges of the individual ignition plugs 21.

The engine 11 has an intake valve 32 and an exhaust valve 34, which are respectively provided with valve lift controllers 33 and 35. The intake valve 32 and the exhaust valve 34 may be further provided with variable valve timing controllers, which respectively varies the opening/closing timings of the valves 32, 34.

The engine 11 has an exhaust pipe 22, which is provided with a catalyst 23 such as a three-way catalyst for reducing CO, HC, NOx and so on in the exhaust gas. On the upstream side of the catalyst 23, there is disposed an exhaust gas sensor 24 (e.g., an air/fuel ratio sensor or an oxygen sensor) for detecting the air/fuel ratio or a richness/leanness of the exhaust gas.

To the cylinder block of the engine 11, moreover, there are attached a cooling water temperature sensor 25 for detecting the temperature of cooling water, and a crank angle sensor 26 for outputting a pulse signal each time the crankshaft of the engine 11 turns a predetermined crank angle. The crank angle and the engine speed are detected on the basis of the output signal of the crank angle sensor 26. A knock sensor 42 detecting a knocking of the engine is attached on the cylinder block of the engine 11.

The outputs of the sensors are inputted to an electric control circuit, which is referred to as ECU 27 hereinafter. The ECU 27 is constructed mainly of a microcomputer including CPU 28, ROM 29, RAM 30, and backup RAM 31. The ECU 27 executes the various engine control programs stored in the ROM 29 thereby to control the fuel injection rate of the fuel injection valve 20 and the ignition timing of the ignition plug 21 in accordance with the engine running state.

Figure 2:
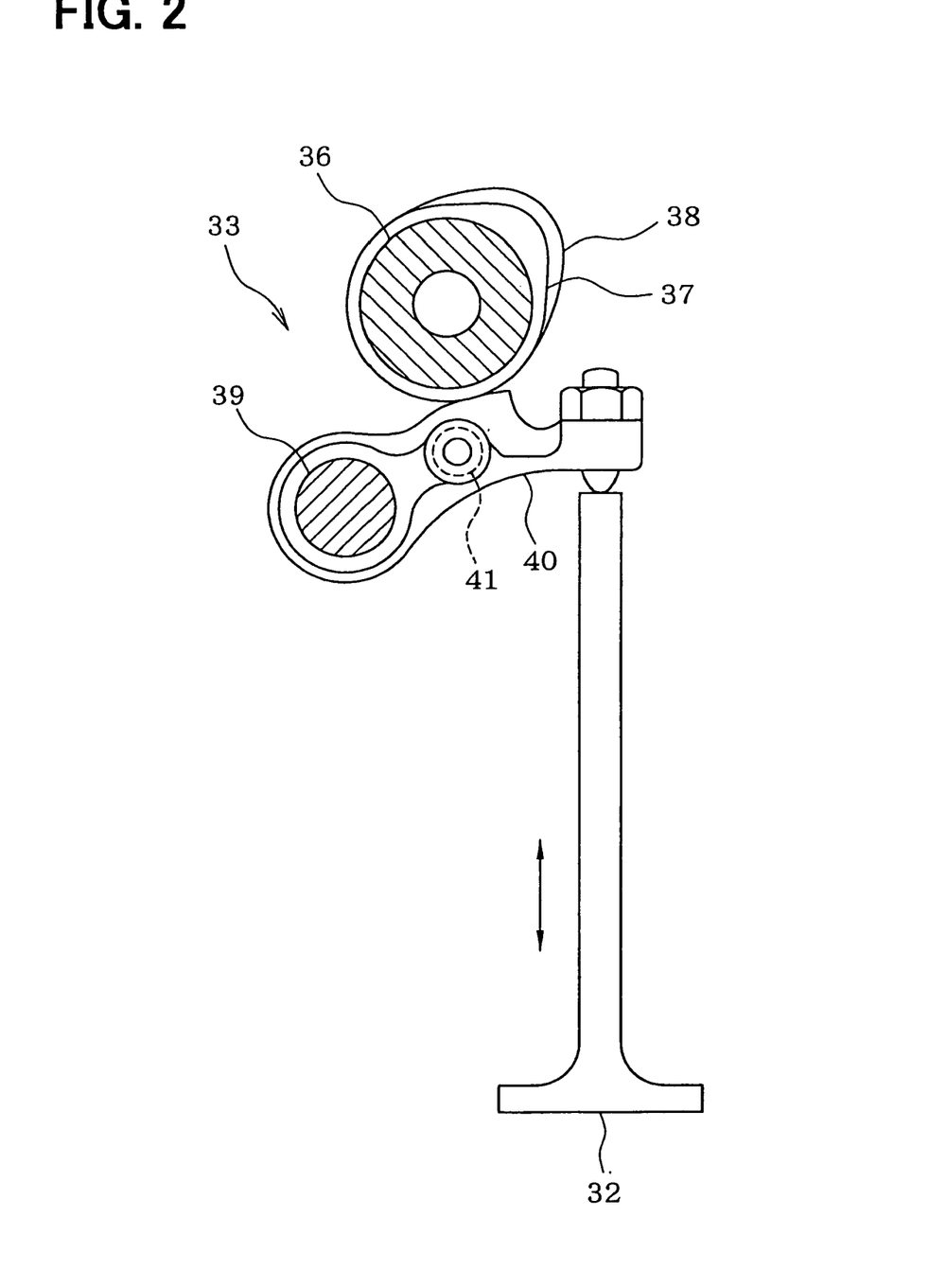
FIG. 2 is a front view of an intake valve lift controller.

Referring to FIG. 2, the construction of the intake valve lift controller 33 is described hereinafter.

As shown in FIG. 2, a camshaft 36 of the intake valve 32 is provided with a low-speed cam 37 and high-speed cam 38, which rotate integrally with the camshaft 36. Under the camshaft 36, a rocker shaft 39 is located. A rocker arm 40 is pivoted on the rocker shaft 39 in such a manner that the rocker arm 40 swing around the rocker shaft 39. An upper end of the intake valve 32 is attached to a tip portion of the rocker arm 40, so that the intake valve 32 is moved up/down by the rocker arm 40.

The rocker arm 40 has a pushing portion for the high-speed cam 38 and a pushing portion for the low-speed cam 37. The low-speed cam 37 has a cam-profile in which a pushing amount to the rocker arm 40 is relatively small and a pushing period is also relatively short. On the other hand, the high-speed cam 38 has a cam-profile in which the pushing amount is relatively large and the pushing period is relatively long.

The rocker arm 40 has a cam-switching mechanism 41 driven by an oil pressure. The cam-switching mechanism 41 switches the cam engaging with the rocker arm 40 between the high-speed cam 38 and the low-speed cam 37.

Figure 3:
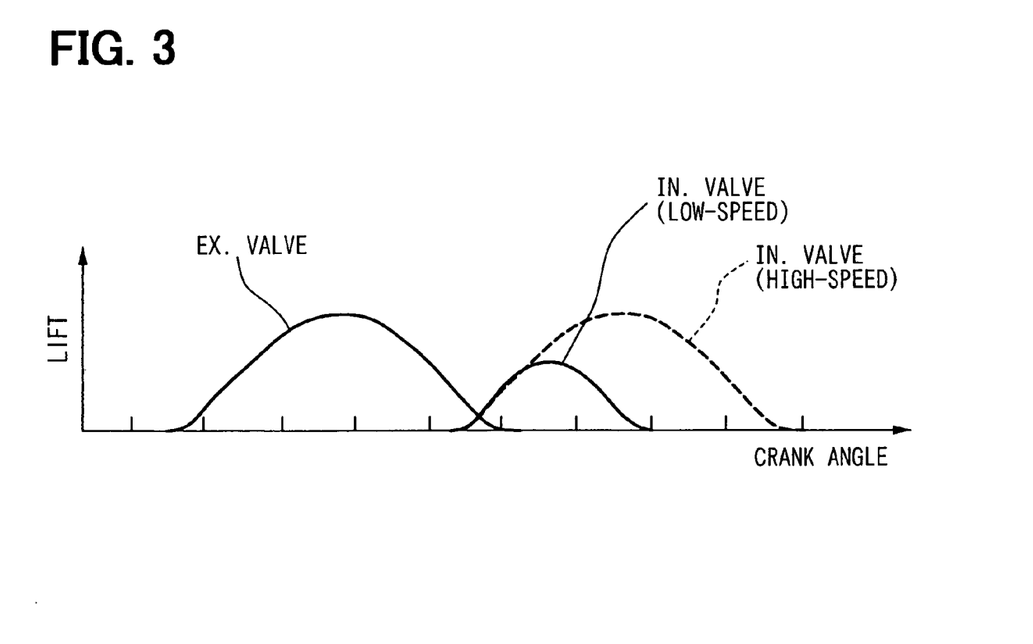
FIG. 3 is a chart showing a characteristic of the intake valve lift controller at both a low-speed mode and a high-speed mode.
Figure 4:
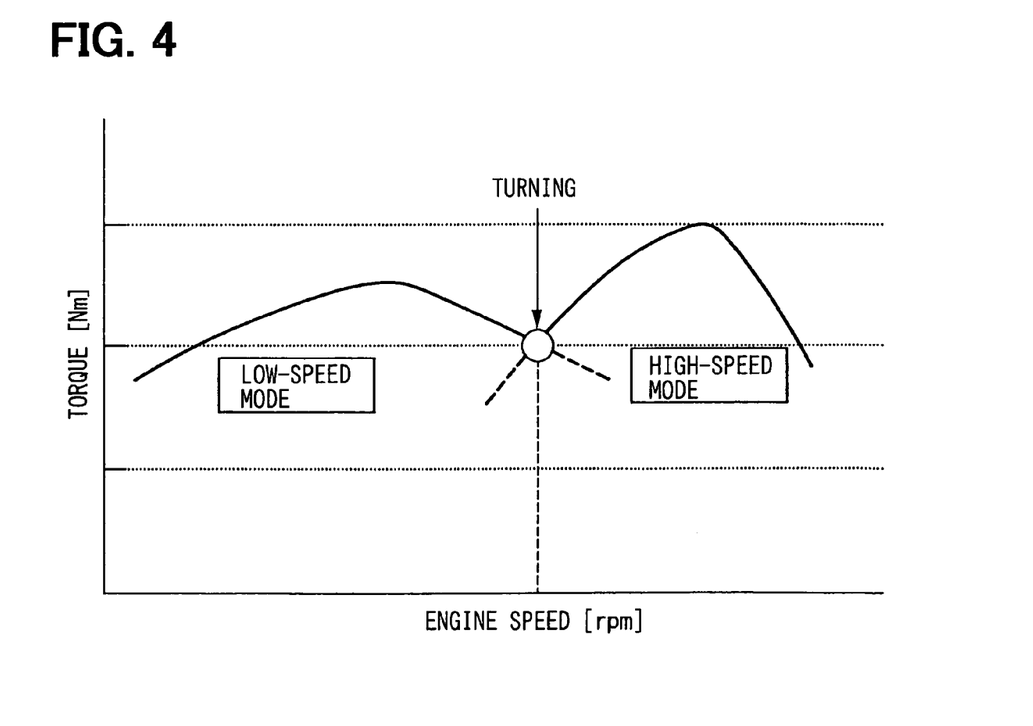
FIG. 4 is a chart showing a characteristic of the intake valve lift controller.

When the control mode of the intake valve lift controller 33 is turned into the low-speed mode, the low-speed cam 37 is in contact with the rocker arm 40 to drive the intake valve 32. Thereby, as shown by a solid line in FIG. 3, the valve lift amount of intake valve 32 is decreased and the pushing period by the rocker arm 40 is decreased. Thus, the opening period of the intake valve 32 is decreased.

On the other hand, when the control mode of the intake valve lift controller 33 is turned into the high-speed mode, the high-speed cam 38 is in contact with the rocker arm 40 to drive the intake valve 32. Thereby, as shown by a dotted line in FIG. 3, the valve lift amount of intake valve 32 is increased and the pushing period by the rocker arm 40 is increased. Thus, the opening period of the intake valve 32 is increased.

The ECU 27 switches the control mode of the intake valve lift controller 33 between the low-speed mode and the high-speed mode according to the engine operation condition such as engine speed and engine load. An output torque of the engine 11 at the time of changing the control mode into the low-speed mode is equal to an output torque of the engine at the time of changing the control mode into the high-speed mode. Thus, torque variations are restricted when the control mode of the intake valve lift controller 33 is changed.

Figure 5:
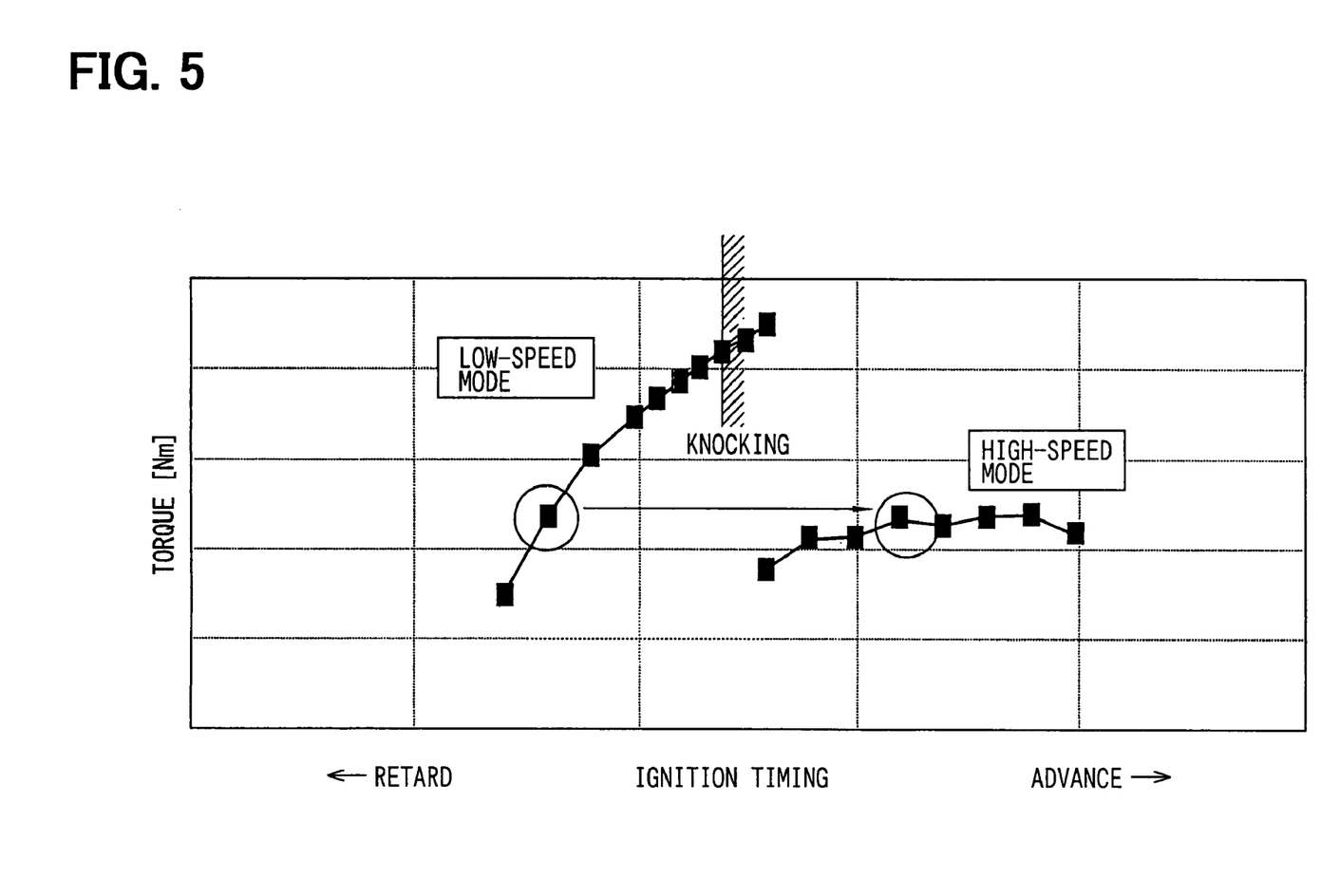
FIG. 5 is a chart showing a ignition timing at both a low-speed mode and a high-speed mode of the intake valve lift controller.

Generally, when the control mode of the intake valve lift controller 33 is changed to vary the valve profile, which is a valve lift amount, a valve opening period, a valve closing timing and the like, the proper ignition timing is varied. Thus, the ECU 27 executes a basic-ignition-timing calculation routine shown in FIG. 7 to correct the ignition timing in case of changing the control mode of the intake valve lift controller 33. In high-speed mode, since the valve-opening period of the intake valve 32 is relatively long and valve-closing timing is retarded, it is necessary to advance the ignition timing to keep a stable combustion. Therefore, the ignition timing is advanced in the high-speed mode rather than in the low-speed mode at the same engine condition. As illustrated in FIG. 5, when the control mode is changed from the low-speed mode to the high-speed mode, the ignition timing is advanced. On the other hand, when the control mode is changed from the high-speed mode to the low-speed mode, the ignition timing is retarded.

Figure 8:
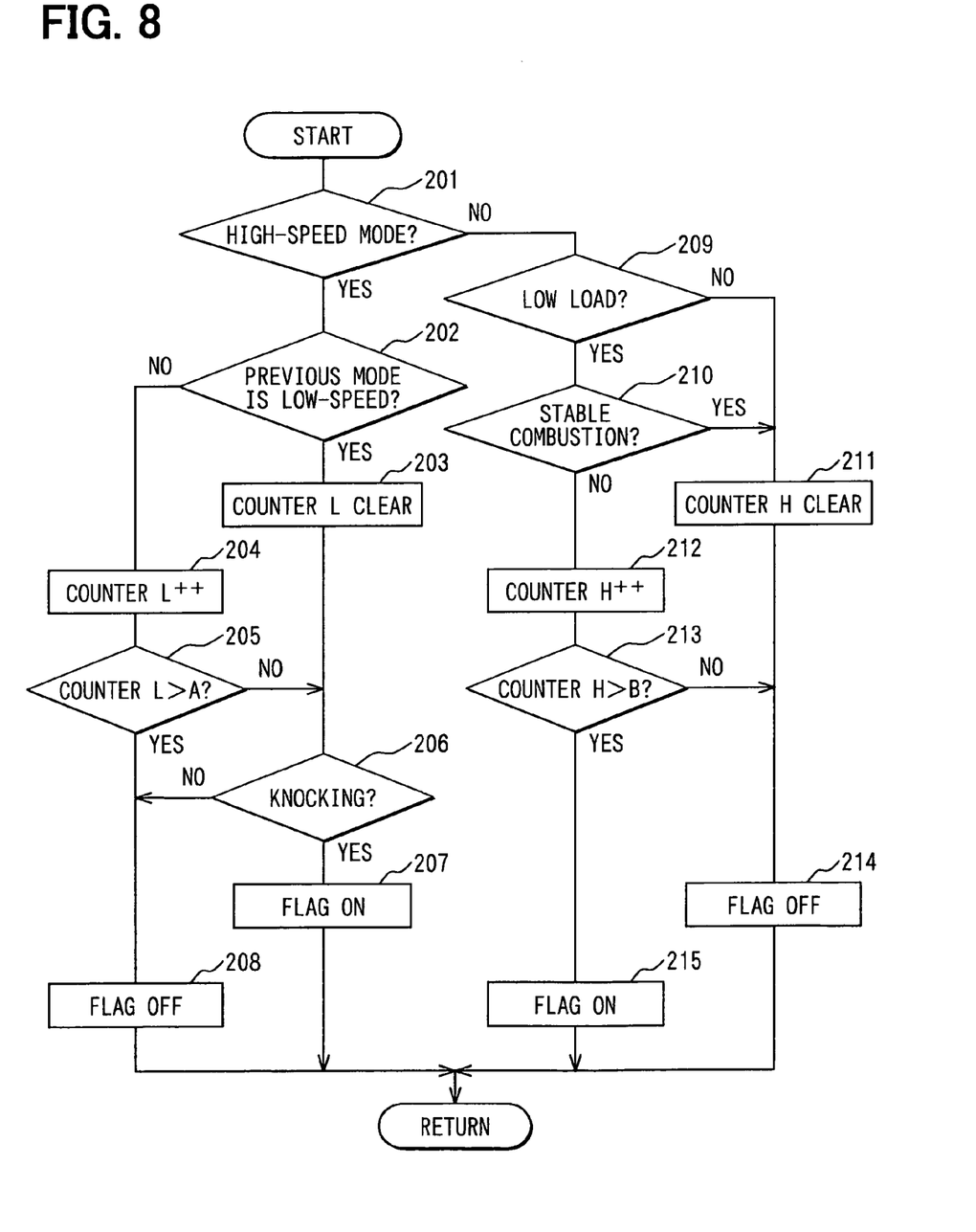
FIG. 8 is a flowchart showing a malfunction diagnosis routine.

The ECU 27 executes a malfunction diagnosis routine shown in FIG. 8 to detect malfunctions of the intake valve lift controller 33.

Figure 6A:
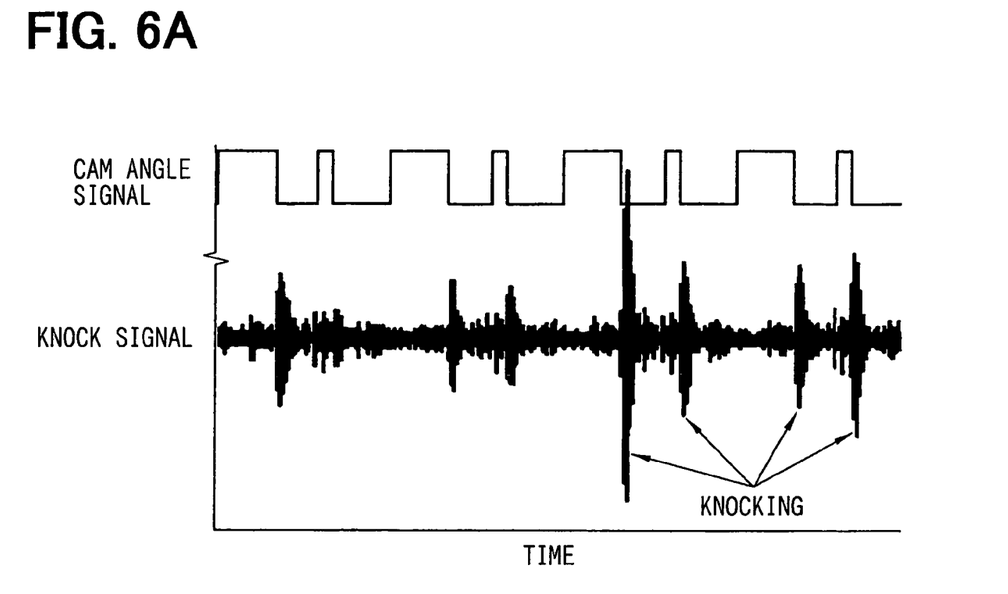
FIG. 6A is a time chart showing an output signal of a knock sensor in case that knocking is generating.

When the control mode of the intake valve lift controller 33 is changed from the low-speed mode to the high-speed mode, the ignition timing is advanced. When the control mode is still in the low-speed mode even if the computer outputs a signal to change the control mode from the low-speed mode to the high-speed mode, the advanced ignition timing exceeds the knock limit to cause a knocking as shown in FIG. 6A.

When the ECU 27 receives a knocking signal from the knock sensor 42 in a predetermined period after the control mode is changed from the low-speed mode to the high-speed mode, it is determined that there are malfunctions in the intake valve lift controller 33. In order to distinguish the knocking due to the malfunctions of the intake valve lift controller 33 from the knocking due to the other reason, the diagnosis is executed only in the predetermined period.

On the other hand, when the control mode of the intake valve lift controller 33 is changed from the high-speed mode to the low-speed mode, the ignition timing is retarded. When the control mode is still in the high-speed mode even if the computer outputs a signal to change the control mode from the high-speed mode to the low-speed mode, the ignition timing is retarded than a proper ignition timing of the high-speed mode, so that the combustion becomes unstable in low-load driving, such as in idling.

The ECU determines that the intake valve lift controller 33 has malfunctions when the combustion stability has been under a predetermined level for a predetermined period in a low-load driving after the control mode is changed from the high-speed mode to the low-speed mode.

Figure 7:
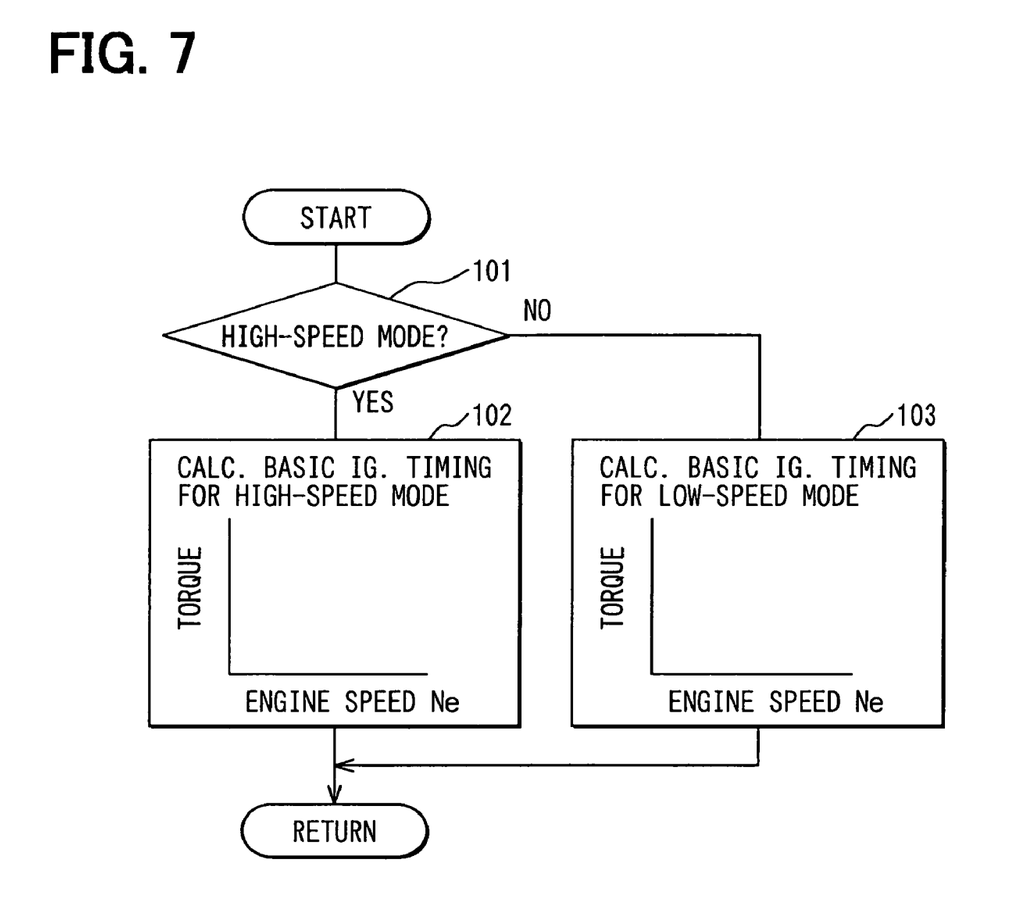
FIG. 7 is a flowchart showing a basic ignition timing calculation routine.

Referring to FIG. 7 and FIG. 8, the program routine which the ECU 27 executes is described hereinafter.

[Calculation of Basic Ignition Timing]

A basic ignition timing calculation routine shown in FIG. 7 is executed is a predetermined interval while the engine is running. In step 101, it is determined whether the controls mode of the intake valve lift controller 33 is the high-speed mode. When it is Yes in step 101, the procedure proceeds to step 102 in which a basic ignition timing is calculated according to the present engine condition, such as an engine speed Ne and a required torque, by means of a basic ignition timing map for high-speed mode.

Since the close timing of the intake valve 32 is retarded in the high-speed mode, it is necessary to advance the ignition timing to keep a stable combustion. The basic ignition timing map for the high-speed mode is formed to be more advanced than the map for the low-speed mode.

When it is determined that the control mode of the intake valve lift controller 33 is the low-speed mode, the procedure proceeds to step 103 in which a basic ignition timing is calculated according to the present engine condition, such as an engine speed Ne and a required torque, by means of a basic ignition timing map for low-speed mode.

As described above, the final ignition timing is determined according to the control mode.

[Malfunctions Diagnosis]

A malfunction diagnosis routine shown in FIG. 8, which is a diagnosis means, is executed is a predetermined interval while the engine is running. In step 201, it is determined whether the control mode of the intake valve lift controller 33 is the high-speed mode.

When it is Yes in step 201, the procedure proceeds to step 202. In step 202, it is determined whether the previous control mode is the low-speed mode. When it is Yes in step 202, the procedure proceeds to step 203 in which a count number of a counter L is cleared to zero, the counter L measuring an elapsed time after the control mode is turned from the low-speed mode to the high-speed mode. Then, the procedure proceeds to step 206.

When it is determined that the previous control mode is the high-speed mode in step 202, the procedure proceeds to step 204, in which the counter L is incremented. Then, the procedure proceeds to step 205 in which it is determined the count value of the counter L exceeds a predetermined value "A". The count value of the counter L corresponds to an elapsed time after the control mode is turned into the high-speed mode. When the count value is less than the predetermined value "A", the procedure proceeds to step 206.

After processing step 205 or when it is No in step 205, the procedure proceeds to step 206, in which it is determined whether a knocking is detected by a knock sensor 42. When the number of knocking detection exceeds a predetermined number, it can be determined that a knocking is generated. The predetermine number can be altered according to a level of knocking.

In a predetermined period after the control mode is turned from the low-speed mode to the high-speed mode, when it is determined that the knocking is generated in step 206, it is determined that the actual control mode is stuck in the low-speed mode even though the control mode is turned to high-speed mode. That is, it is determined that the advanced ignition timing based on the turning of the control mode exceeds the knock limit in the low-speed mode to generate the knocking. Then, the procedure proceeds to step 207 in which it is determined that the intake valve lift controller 33 has malfunctions so that a low-speed mode malfunction flag is set ON that represents the intake valve controller 33 is stuck in the low-speed mode. An alarm lump (not shown) or an alarm sign on a instrument panel is turned on to alert a driver, and malfunction data, such as malfunction codes, are stored in a nonvolatile memory such as a buck-up RAM 31 in the ECU 27 to end the routine.

When it is determined that the knocking is not detected in step 206 in the predetermined period after the control mode is turned from the low-speed mode to the high speed mode, or when it is determined Yes in step 205 in the predetermined period, the procedure proceeds to step 208. In step 208, it is determined that the intake valve lift controller 33 has no malfunctions and the low-speed mode malfunction flag is turned OFF to end the routine.

In step 201, when it is determined that the control mode of the intake valve lift controller 33 is the low-speed mode, the procedure proceeds to step 209 in which it is determined whether the engine is in a low-load condition such as idling where the engine speed is lower than a predetermined value and the engine load, such as an intake air volume, an intake pipe pressure, and the like, is lower than a predetermined value.

When it is determined Yes in step 209, the procedure proceeds to step 210. In step 210, it is determined whether the combustion of the engine is stable based on whether an engine speed fluctuation ΔNe, a torque fluctuation ΔTr, and a control amount of idle speed control valve are lower than predetermined values respectively.

When it is determined No in step 209 or when it is determined that the combustion condition is higher than a predetermined level in step 210, the procedure proceeds to step 211. In step 211, the count value of a counter H is cleared. The counter H counts a duration in which the engine load is low and the combustion condition is unstable. Then, the procedure proceeds to step 214 in which a high-speed mode malfunction flag is turned OFF to end the routine.

When it is determined that the engine is running under the low-load condition in step 209 and the combustion condition is unstable in step 210, the procedure proceeds to step 212 in which the counter H is incremented. Then, the procedure proceeds to step 213 in which it is determined whether the count value of the counter H exceeds the predetermined value "B".

In step 213, when it is determined that a duration of low-load condition and unstable combustion of the engine exceeds a predetermined period, it is determined that the actual control mode is stuck in the high-speed mode even though the control mode is turned to the low-speed mode. That is, it is determined that the engine is running under more retarded ignition timing than a proper ignition timing in the high-speed mode, and that the combustion under the low-load is unstable. Then, the procedure proceeds to step 215 in which it is determined that the intake valve lift controller 33 has malfunctions and the high-speed mode malfunction flag is turned ON to end the routine.

On the other hand, when it is determined that the duration of the low-load and unstable combustion does not reach to a predetermined period in step 213, the procedure proceeds to step 214 in which it is determined that the intake valve lift controller 33 has no malfunctions and the high-speed mode malfunction flag is turned OFF to end the routine.

According to the present embodiment, when the intake valve lift controller 33 is stuck in the low-speed mode, a knocking is generated and it is determined that the intake valve lift controller 33 has malfunctions. The knocking is precisely detected by the knock sensor 42, so that the malfunctions of the intake valve lift controller 33 is also precisely detected. Thus, an additional lift sensor for the intake valve is not necessary, so that the construction of the system is simplified and cost is reduced.

Figure 6B:
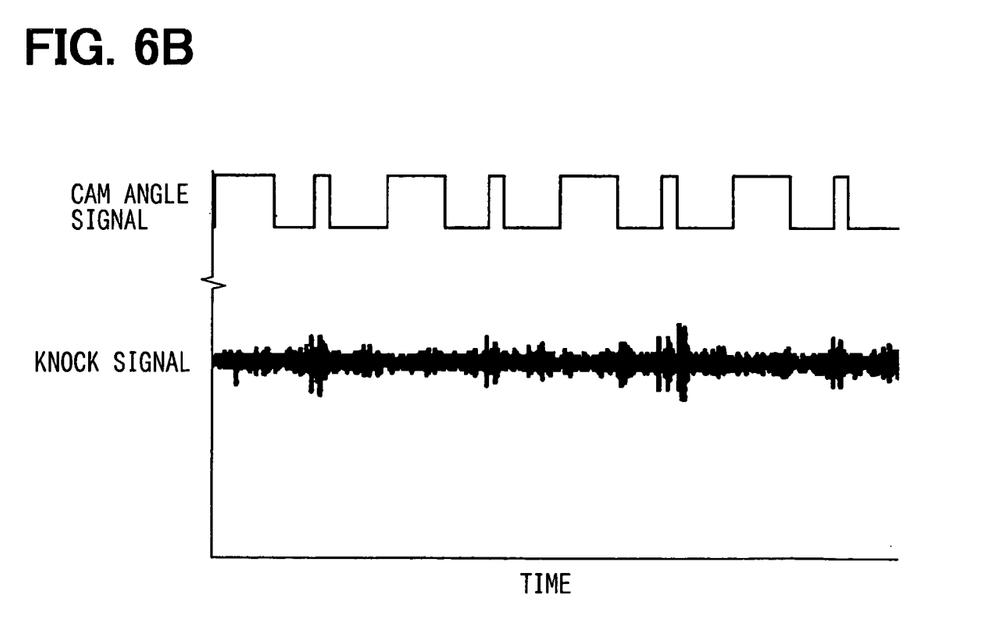
FIG. 6B is a time chart showing an output signal of the knock sensor in case that no knocking is generated.

Based on output signals of cam angel sensor (FIGS. 6A, 6B) and output signals of the knock sensor 42, the malfunctions of the intake valve lift controller 33 can be diagnosed with respect to the individual cylinders. Since the combustion cylinder can be identified based on the output signal of the cam angle sensor, the knocking can be detected cylinder by cylinder to diagnose the intake valve lift controller 33.

As mentioned above, the combustion of the engine becomes unstable when the intake valve lift controller 33 is stuck in the high-speed mode. According to the present invention, the malfunctions of the intake valve lift controller 33 are precisely detected when the combustion stability is lowed to a predetermined value or less.

The present invention can be applied to not only an intake valve controller varying a valve lift or valve opening period but also a controller varying an intake valve opening timing and/or a valve profile of the exhaust valve, the valve profile representing at least one of a valve lift amount of the exhaust valve, a valve opening period of the exhaust valve, and a valve timing of the exhaust valve.

In the aforementioned embodiment, the variable valve controller switches its valve profile between stages. The variable valve controller can switch its valve profile between three stages or more. The variable valve controller can vary its valve profile continuously.

The variable valve controller is not limited to an oil-hydraulic driving controller, which can be replaced by an electromagnetic driving valve.

What is claimed is:

1. A diagnosis system for a variable valve controller, the variable valve controller changing a valve profile of an intake valve and/or an exhaust valve from a control mode to another control mode based on a condition of an internal combustion engine, an ignition timing varied according to a change of the control mode, comprising:
    a knock detecting means for detecting a knocking of the internal combustion engine; and
    a malfunction diagnosis means for diagnosing whether a malfunction of the variable valve controller exists based on a detecting result by the knock detecting means when the control mode of the variable valve controller is changed.

2. The diagnosis system for a variable valve controller according to claim 1, wherein
    the malfunction diagnosis means determines that the variable valve controller has a malfunction when a knocking is detected by the knock detecting means after the control mode is changed from a low-speed mode in which a valve lift amount and/or a valve opening period is decreased to a high-speed mode in which the valve lift amount and/or the valve opening period is increased.

3. The diagnosis system for a variable valve controller according to claim 1, further comprising
    a cam angle sensor outputting a cam angle signal every predetermined cam angles,
    the malfunction diagnosis means diagnosing a malfunction of the variable valve controller for individual cylinders based on the cam angle signal and an output signal of the knock detecting means.

4. The diagnosis system for a variable valve controller according to claim 1, further comprising
    a combustion determine means for determining whether a combustion stability of the engine is over a predetermined value,
    the malfunction diagnosis means determines that the variable valve controller has a malfunction when the combustion stability is lowed to the predetermined value after the control mode is changed from a high-speed mode in which a valve lift amount and/or a valve opening period is increased to a low-speed mode in which the valve lift amount and/or the valve opening period is decreased.

* * * * *